US012740629B2

(12) United States Patent
Sze

(10) Patent No.: US 12,740,629 B2
(45) Date of Patent: Sep. 22, 2026

(54) HAIR FASTENERS AND METHODS OF MANUFACTURE THEREOF

(71) Applicant: Tung Hing Plastic Manufactory Limited, Hong Kong (HK)

(72) Inventor: Ka Chuen Sze, Hong Kong (HK)

(73) Assignee: Tung Hing Plastic Manufactory Limited, Hong Kong (HK)

( * ) Notice: Subject to any disclaimer, the term of this patent is extended or adjusted under 35 U.S.C. 154(b) by 309 days.

(21) Appl. No.: 17/652,426

(22) Filed: Feb. 24, 2022

(65) Prior Publication Data

US 2022/0175105 A1 Jun. 9, 2022

Related U.S. Application Data

(63) Continuation-in-part of application No. 16/417,686, filed on May 21, 2019, now abandoned, and a (Continued)

(51) Int. Cl.
*A45D 8/34* (2006.01)
*B29C 45/00* (2006.01)
(Continued)

(52) U.S. Cl.
CPC ............ *A45D 8/34* (2013.01); *B29C 45/0046* (2013.01); *B29C 45/0053* (2013.01); *C08L 53/02* (2013.01); *C08L 75/04* (2013.01); *C08L 83/04* (2013.01); *B29C 2045/0079* (2013.01); *B29K 2009/00* (2013.01); *B29K 2025/08* (2013.01); *B29K 2075/00* (2013.01); *B29K 2083/00* (2013.01); *B29K 2995/0046* (2013.01); *B29K 2995/0077* (2013.01); *B29L 2031/718* (2013.01); *C08L 2207/04* (2013.01)

(58) Field of Classification Search
CPC . A45D 8/00; A45D 8/002; A45D 8/34; A45D 8/36
See application file for complete search history.

(56) References Cited

U.S. PATENT DOCUMENTS 6,000,408 A * 12/1999 Maturaporn ............ A45D 8/34 132/273
10,405,629 B2 * 9/2019 Trelles-Tvede .......... A45D 8/34
(Continued)

FOREIGN PATENT DOCUMENTS

CN 200204317807 U 11/2014
WO 2006055464 A1 5/2006

*Primary Examiner* — Rachel R Steitz
(74) *Attorney, Agent, or Firm* — Melvin Li

(57) ABSTRACT

There is disclosed a hair fastener. The hair fastener is in the form of a loop for securing a log of hair within the loop. The hair fastener has an inner elastic core and an outer fabric enveloping the inner elastic core, wherein the elastic core is made of a band with a width of 2 to 6 mm and a thickness of 1 to 3 mm, and made of silicone or a material of thermoplastic elastomer (TPE) selected from the consisting of hydrogenated styrenic block copolymers (SEBS), thermoplastic polyurethane (TPU) and thermoplastic vulcanizates (TPV). The hair fastener is adapted to assume a first, default, configuration in which an opening defined and surrounded by the loop has a first area and a second, fully expanded, configuration in which the opening defined and surrounded by the loop has a second area.

6 Claims, 6 Drawing Sheets

Related U.S. Application Data continuation-in-part of application No. 16/184,544, filed on Nov. 8, 2018, now abandoned.

(51) Int. Cl.

| | |
|---|---|
| ***C08L 53/02*** | (2006.01) |
| ***C08L 75/04*** | (2006.01) |
| ***C08L 83/04*** | (2006.01) |
| *B29K 9/00* | (2006.01) |
| *B29K 25/00* | (2006.01) |
| *B29K 75/00* | (2006.01) |
| *B29K 83/00* | (2006.01) |
| *B29L 31/00* | (2006.01) |

(56) References Cited

U.S. PATENT DOCUMENTS

2015/0327649 A1* 11/2015 Sze .......................... A45D 8/34
132/273
2016/0213120 A1* 7/2016 Sze .......................... A45D 8/34
2018/0199687 A1* 7/2018 Ham ........................ A45D 8/36
2020/0390214 A1* 12/2020 Chu ......................... A45D 8/34

* cited by examiner 14
14
12
"a"

HAIR FASTENERS AND METHODS OF MANUFACTURE THEREOF

CROSS REFERENCE TO RELATED APPLICATION

The present application is a continuation-in-part application from earlier filed U.S. patent application Ser. No. 16/184,544 filed Nov. 8, 2018 and U.S. patent application Ser. No. 16/417,686 filed May 21, 2019 (which is a continuation-in-part application from U.S. patent application Ser. No. 14/962,076 filed Dec. 8, 2015), contents of which are incorporated herein in their entirety.

FIELD OF THE INVENTION

The present invention is concerned with an improved hair fastener and a method of manufacture thereof.

BACKGROUND OF THE INVENTION

There are many hair fastening devices in the market to suit different needs of securing hair. Such devices include hair claws, barrettes, etc. One type of hair fasteners known as hair loop is commonly used to maintain a pony tail of a user. Nevertheless, such hair loops often suffer from different drawbacks. For example, an inner structure of such hair loops made of a fabric material often retains moisture which hinders the tying performance of the hair loop, increases weight to the hair loop, and/or would cause hygiene problems. Further, hair loops in the market often are not sufficiently accommodative to secure hair logs of vastly different sizes of different users. The present invention seeks to address at least both issues of tying performance and tying comfort as well increasing tying adaptability to suit different users, or at least to provide an alternative to the public.

SUMMARY OF THE INVENTION

According to a first aspect of the present invention, there is provided a hair fastener in the form of a loop for securing a log of hair within the loop, comprising an inner elastic core and an outer fabric enveloping and loosely fitted around the inner elastic core, wherein i) the elastic core is made of a band with a width of 2 to 6 mm and a thickness of 1 to 3 mm, and made of silicone or a thermoplastic elastomer material selected from the group consisting of hydrogenated styrenic block copolymers (SEBS), thermoplastic polyurethane (TPU) and thermoplastic vulcanizates (TPV), ii) the fastener is adapted to assume a first, default, configuration in which an opening defined and surrounded by the loop has a first area and a second, fully expanded, configuration in which the opening defined and surrounded by the loop has a second area, iii) the tensile stress of the band has a value of 3.02 to 4.08 MPa, v) the band has a Shore Hardness A of 23.8 to 32.2, vi the outer fabric is sufficiently loose to provide room for maximum expansion of the band, and vii) due to a combination of dimensional configuration, physical configuration and material characteristics of the band, the band is elongateable up to 8.5 to 10 times of its original length thus enabling the first area of the loop to expand to the second area by a factor 72.3 to 100.

Preferably, the tensile modulus of the band may have a value of 0.37 to 0.49 Mpa.

Suitably, the maximum pull strength of the band may have a value of 57.31N. The specific gravity of the band may have a value of 0.9.

Advantageously, the band resembling a circle may have a joint connecting opposite free ends of the band by adhesives and enveloped in the outer fabric.

In one embodiment, the band resembling a circle may have an integral structure made from one injection molding step free of a joint and enveloped within the outer fabric.

According to a second aspect of the present invention, there is provided a hair fastener in the form of a loop for securing a log of hair within the loop, comprising an inner elastic core made of a band with a width of 2 to 6 mm and a thickness of 1 to 3 mm and an outer fabric enveloping the inner elastic core, wherein the elastic core is made of silicone or a material of thermoplastic elastomer (TPE) selected from the consisting of hydrogenated styrenic block copolymers (SEBS), thermoplastic polyurethane (TPU) and thermoplastic vulcanizates (TPV), wherein the fastener is adapted to assume a first, default, configuration in which an opening defined and surrounded by the loop has a first area and a second, fully expanded, configuration in which the opening defined and surrounded by the loop has a second area, and wherein, due to a combination of dimensional configuration, physical configuration and material characteristics of the band, the band is elongateable up to 8.5 to 10 times of its original length thus enabling the first area of the loop to expand to the second area by a factor 72.3 to 100, and the outer fabric is sufficiently loose to provide room for maximum expansion of the band.

According to a third aspect of the present invention, there is provided a method of manufacture of a hair fastener as claimed in claim 1, comprising a step of forming the elastic core by the thermoplastic elastomer by way of injection molding using a melt flow rate of 7.57 to 10.23 o form a closed loop thus giving rise the elastic core.

BRIEF DESCRIPTION OF THE DRAWINGS

Some embodiments of the present invention will now be explained, with reference to the accompanied drawings, in which.

DETAILED DESCRIPTION OF PREFERRED EMBODIMENTS OF THE INVENTION

Figure 1:
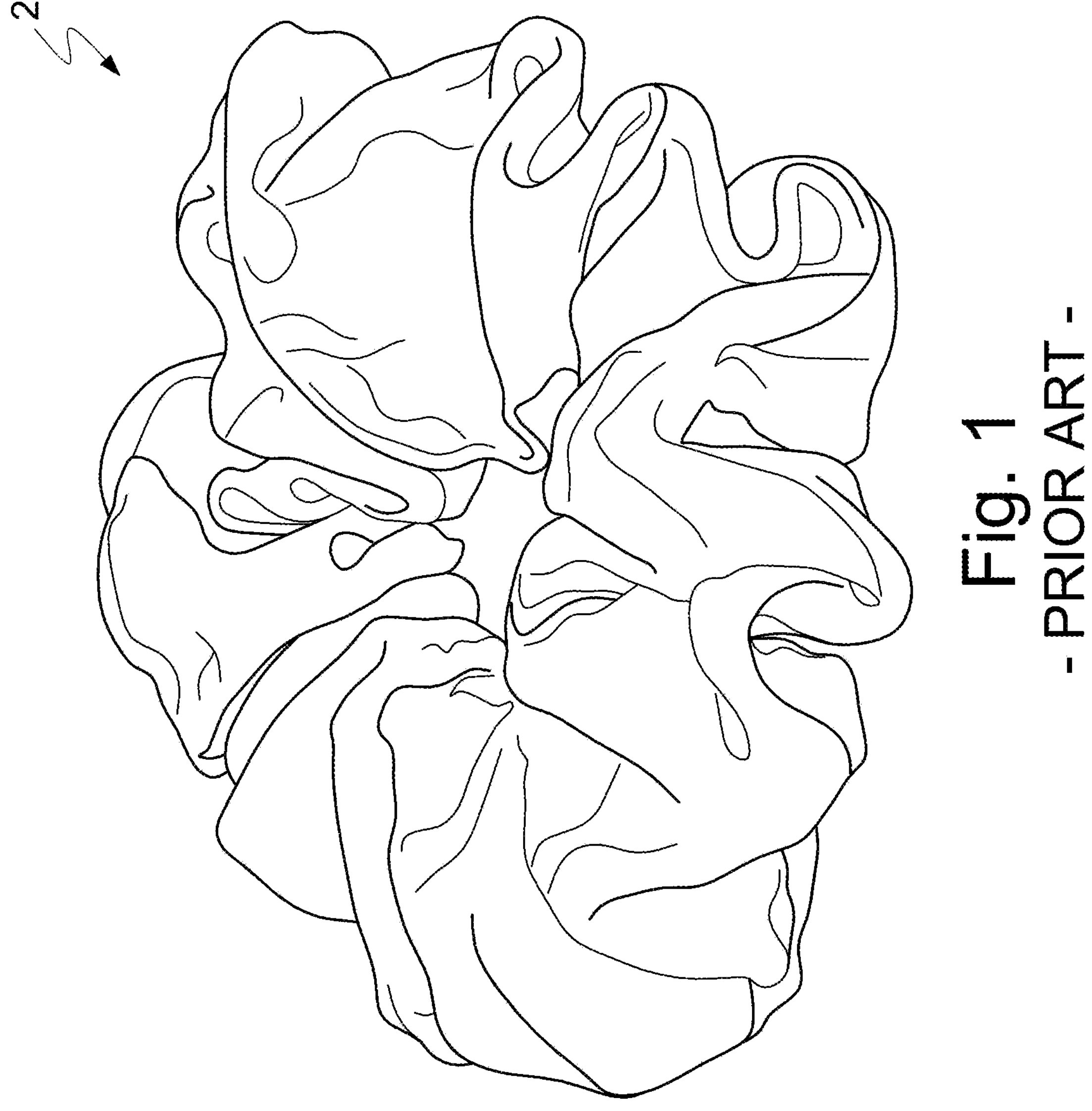
FIG. 1 is a perspective view of an example of a conventional hair loop fastener.
Figures 2A, 2B:
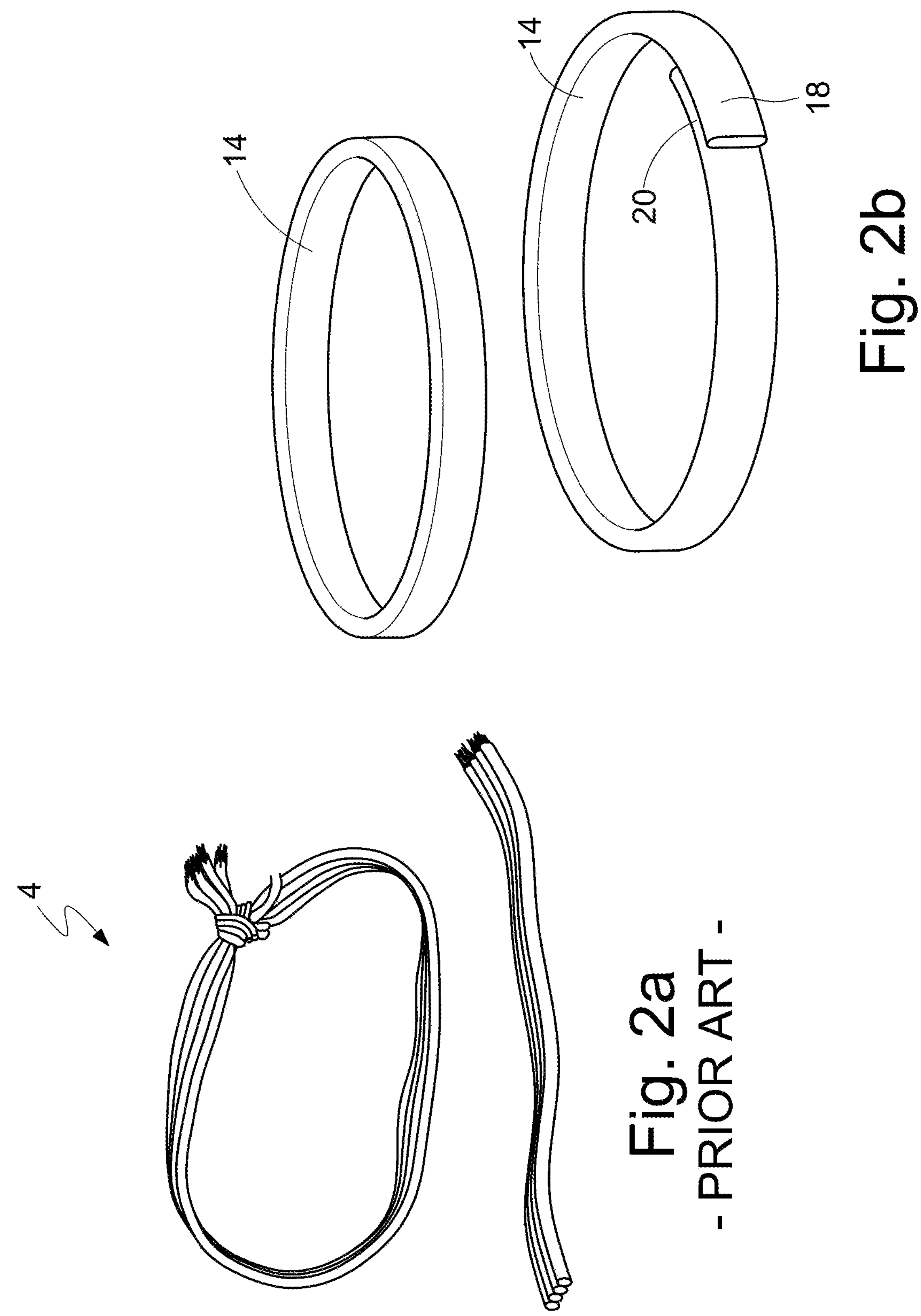
FIG. 2*a* shows an elastic core of the conventional hair loop fastener of FIG. 1.
FIG. 2*b* shows an embodiment of an elastic core of a hair loop fastener according to the present invention.
Figures 3A, 3B:
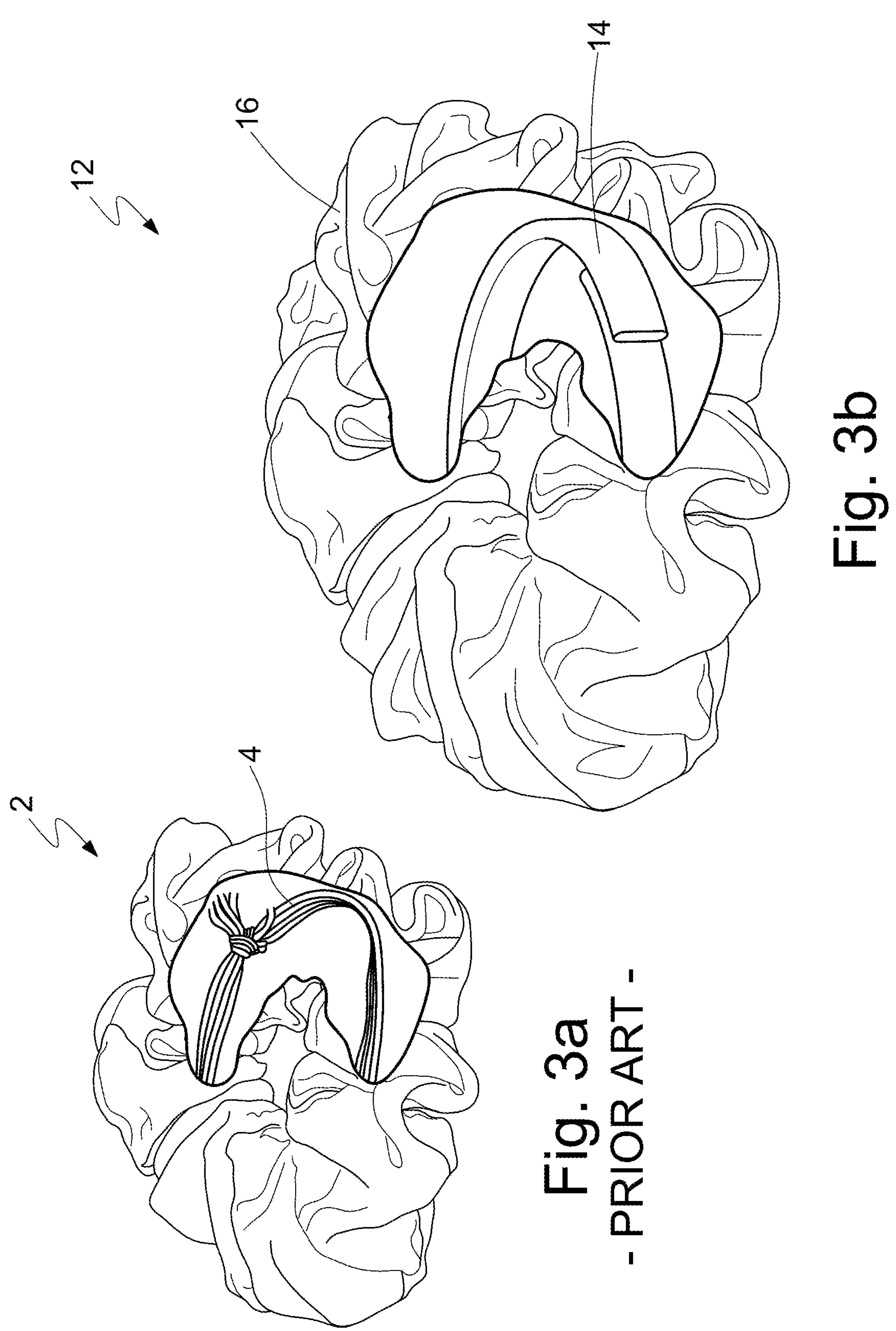
FIG. 3*a* corresponds to FIGS. 1 and 2*b* and schematically illustrates the conventional hair loop fastener of FIG. 1.
FIG. 3*b* shows an embodiment of a hair loop fastener according to the present invention incorporated with an elastic core of FIG. 2*b;*
Figure 4:
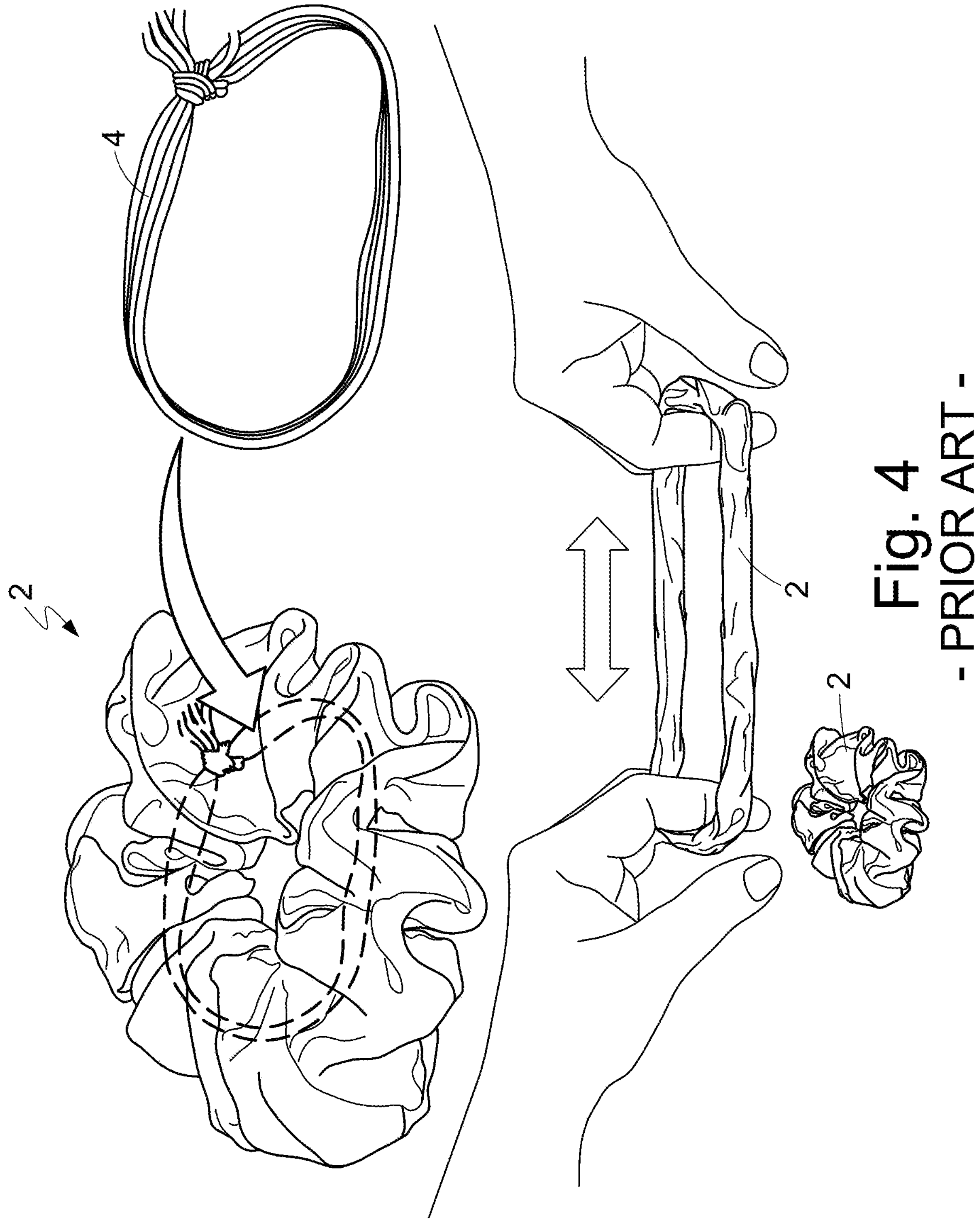
FIG. 4 is a series of schematic diagrams illustrating the expansion of the conventional hair loop fastener of FIGS. 1 and 3*a;*
Figure 5:
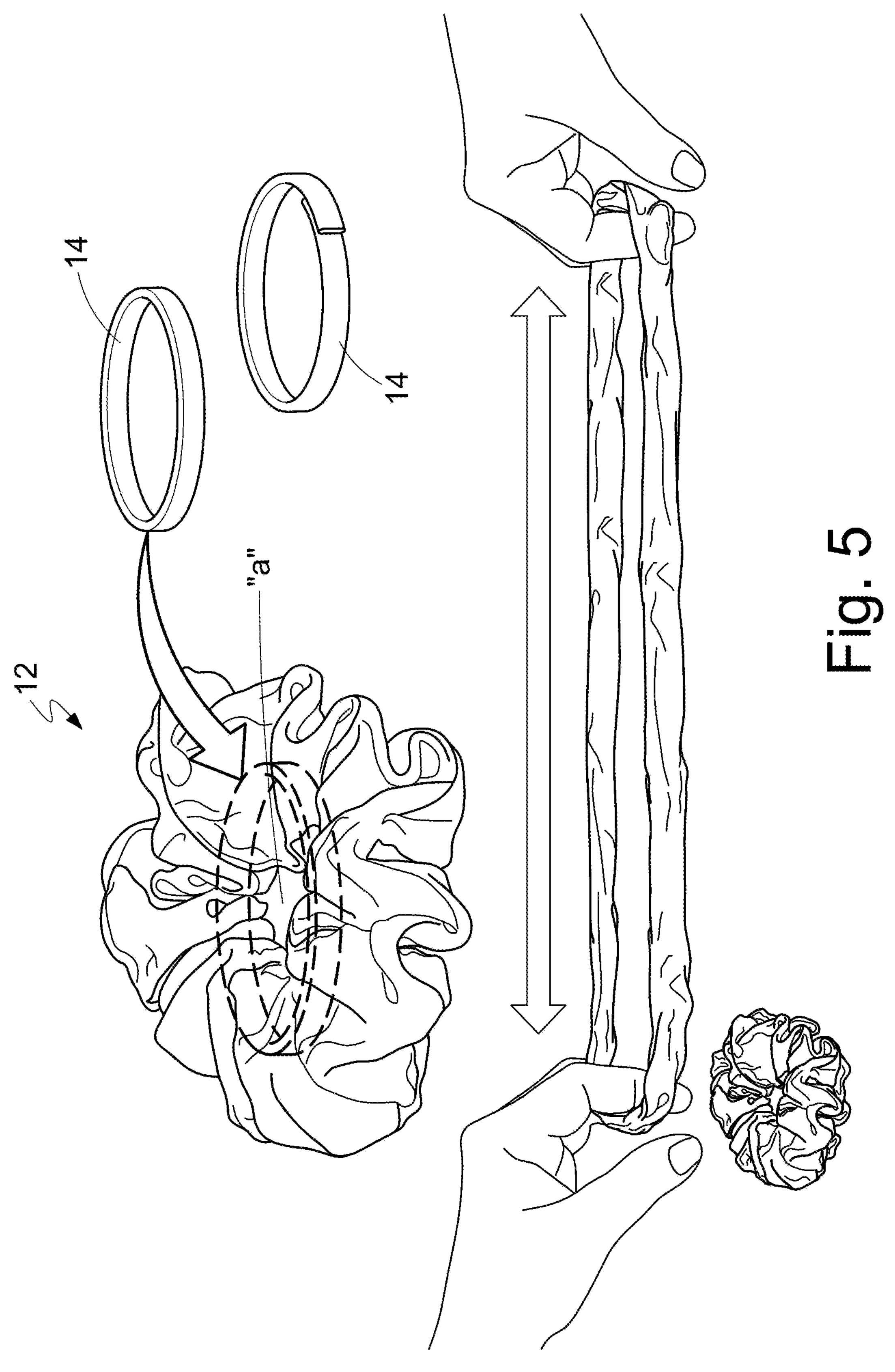
FIG. 5 is a series of schematic diagrams illustrating the expansion of the hair loop fastener of FIG. 3*b*.
Figure 6:
FIG. 6 shows the hair loop fastener of FIGS. 3*b* and 5 during use by a user.

By way of background, a conventional hair fastener is firstly explained. FIG. 1 shows such a conventional hair fastener 2. FIG. 2*a* illustrates an elastic core 4 disposed in the hair fastener 2 of FIG. 1. FIG. 3*a* illustrates the hair fastener 2 with the elastic core 4 positioned therein. The elastic core 4 is made of a knitted structure comprising a fabric material essentially made of or comprising non-polymeric materials. FIG. 4 shows that such hair fasteners can expand in length up to at most four times its original length.

The present invention is concerned with a hair fastener, and in particular a hair fastener in the form of a loop typically used to tie and maintain a pony tail of a user. Such hair fasteners have improved performance.

Referring firstly to FIG. 3*b*, the hair fastener, generally designated 12, has an outer fabric covering 16 loosely enveloping or otherwise enclosing an inner elastic core 14. It is to be noted that, the fabric covering 16, at least in this embodiment, is not knitted over the inner elastic core 14. Instead, it is the form of a loose clothing surrounding. While it provides sufficient room in which the elastic core 14 can expand, it is not, or needs not be, elastic in itself. Referring to FIG. 2*b*, the elastic core 14 is in the form of a band with a width from 2 to 6 mm and a thickness of 1 to 3 mm. In this embodiment, the elastic core 14 is made essentially of hydrogenated styrenic block copolymers (SEBS) which is a thermoplastic elastomer (TPE). Specifically, SEBS used in this embodiment is sourced from Avient® (PolyOne) under product number GLS 388-138 Natural. Referring to FIG. 3*b*, the elastic core 14 is made of a band with opposite open ends 18, 20 connected together by adhesives. Preferably, the elastic core 14 may be formed to a continuous loop structure formed in one injection molding step. Please see FIG. 2*b* upper diagram. The use of a continuous loop is advantageous in that it provides consistency in strength along the loop structure. By way of the dimensional features, the physical characteristics and material characteristics together, the elastic core 14 can elongate from its default state to an expanded state which is 8.5 to 10 times of its original length (default state). The hair fastener 12 in the form of the loop defines an area in which a log of hair is secured. Accordingly, the circular area defined by the loop can expand significantly from its default configuration to its maximum expanded configuration of 72.3 to 100 times. It is envisaged that with such large degree of expansion, a log of hair can be wrapped around by the loop multiple times, at least four or more times. Further, during a hair tying exercise, the hair fastener 12 can be fully stretched to allow a user to more easily manipulate the loop to go around the hair log. Yet further, the use of SEBS as the inner elastic core 14 can minimize moisture trapped within the fabric covering.

In the above illustrated embodiment, SEBS is used. Physical properties of the SEBS are set out in the below Table 1.

TABLE I

| Physical properties of SEBS | |
|---|---|
| | Nominal Value, Unit |
| Physical - Density/Specific Gravity | 0.890 |
| Elastomer - Stress (300% Strain 73° F.) | 143 psi |
| Elastomer - Stress (Yield, 73° F.) | 644 psi |
| Tensile Elongation (Break, 73° F.) | 910% |
| Hardness - Durometer Hardness (Shore A, 1-sec) | 20 |
| Full Analysis - Apparent Viscosity (392° F., 11200 sec$^{-1)}$ | 8.00 Pa.s |

Studies leading to the present invention has shown that as long as the SEBS material possesses these properties within +/−15% margin, the elastic core and the ultimate hair fastener made therefrom are still able to meet the functional characteristics as targeted. Further, studies leading to the present invention have identified that workable alternative materials consist of silicone, thermoplastic polyurethane (TPU) of TPE, and thermoplastic vulcanizates (TPV) of TPE; these alternatives possess these properties within +/−15% margin. It is to be understood that one aspect of the present invention is directed to a hair fastener, and not a new species or type of a polymeric material. Skilled person in the art can readily understand the materials of SEB, TPU, TPV and silicone and can acquire these material.

While in different embodiments the circumferential length of the band of the elastic core 14 may assume any length, research and development leading to the present invention have indicated that, in addition to the materials of the elastic core, the dimensions of the elastic core including the length would impact the tying performance in the context of the present invention. In this regard, studies have identified that the elastic core 14 preferably has a circumferential length of 8 to 18 cm in order to produce the desired tying performance Studies have shown that the hair fastener 12 as described can enhance the ease and reliability of hair tying. The following table shows further preferred characteristics of the inner elastic core in one experiment.

TABLE 2

Experimental Data of Inner Elastic Core of Hair Loop Fastener

| Properties | Test Condition | Typical Value | Unit |
|---|---|---|---|
| Melt Flow Rate | 190° C./5 Kg | 8.9 | g/10 min |
| Specific Gravity | 25° C. | 0.9 | N/A |
| Shore Hardness A | 25° C./5 sec | 28 | A |
| Tensile Strength | 25° C./500 mm/min | 3.55 | Mpa |
| Ultimate elongation | 25° C./500 mm/min | 1018.13 | % |
| Maximum pull | 25° C./500 mm/min | 57031 | N |
| Tensile Modulus | 25° C./500 mm/min | 0.43 | Mpa |
| Tensile Stress @ 100% | 25° C./500 mm/min | 0.45 | Mpa |
| Hardness in Air Shore A | 100° C./168 hours | / | A |
| Tensile Strength in Air | 100° C./168 hours | / | % |
| Average shrinkage | 25° C./168 hours | / | % |
| ROHS | EDX3000B | ND | ppm |

Further experiments have identified that the test results stay within a ±15% margin.

In a first embodiment of a method of manufacture, the elastic core 14 may first be formed to an elongate band of a continuous closed loop by way of injection molding. The loop is not made for an elongate band with opposite free ends connected together. Table 3 below illustrates the processing information of the SEBS during the injection molding.

TABLE 3

Processing information of the SEBS

| Injection | Nominal Value Unit |
|---|---|
| (Preferred) Max Regrind | 20% |
| Rear Temperature | 330 to 370° F. |
| Middle Temperature | 350 to 380° F. |

TABLE 3-continued

| Processing information of the SEBS | |
|---|---|
| Injection | Nominal Value Unit |
| Front Temperature | 370 to 440° F. |
| Nozzle Temperature | 360 to 420° F. |
| Processing (Melt) Temp | 380 to 440° F. |
| Mold Temperature | 60 to 100° F. |

In alternative embodiments, in which silicone, TPU or TPV is used, as long as conditions within +/−10% margin are used, the hair fastener made therefrom would achieve the desired characteristics of the present invention.

The fabric covering 16 is then produced to form an essentially closed enveloped but with a small opening such resembling a pocket thus allowing the elongate band to fit through fabric covering 16 through the opening. Opposite ends of the band 14 are then connected together by adhesives to a form a loop. The opening of the fabric covering 16 is then closed by stitching so as to fully enclose the loop. In an alternative embodiment, the elastic core 14 may be formed to a loop by one injection molding step followed by placing the loop within the fabric covering. An inner circumference of the hair fastener 12 is then closed by stitching the fabric covering 16 together thus fully concealing the loop. It is to be noted that when formed, the fabric covering is loosely fitted around the elastic core. It is to be noted that the fabric covering is not knitted over the elastic core, it is a cloth material in the form of a loose envelope. While the fabric covering 16 loosely surrounds the elastic core, it is inelastic in itself.

In an embodiment of a method of manufacture of such a hair fastener, there is provided a step of forming the elastic core 14 by the thermoplastic elastomer by way of injection molding using a melt flow rate of 7.57 to 10.23. The use of such a flow rate allows the manufacture elastic core 14 to behave with the desired tying performance as discussed above.

It should be understood that certain features of the invention, which are, for clarity, described in the content of separate embodiments, may be provided in combination in a single embodiment. Conversely, various features of the invention which are, for brevity, described in the content of a single embodiment, may be provided separately or in any appropriate sub-combinations. It is to be noted that certain features of the embodiments are illustrated by way of non-limiting examples. Also, a skilled person in the art will be aware of the prior art which is not explained in the above for brevity purpose.

The invention claimed is:

1. A hair fastener in the form of a loop for securing a lock of hair within the loop, comprising an inner elastic core and an outer fabric enveloping the inner elastic core, wherein:

the elastic core is made of a band resembling a circle having an integral, one piece structure free of any joint or connection between opposite ends, the band being formed as a continuous closed loop, and with a width of 2 to 6 mm and a thickness of 1 to 3 mm, the elastic core is made of silicone or a thermoplastic elastomer material selected from the group consisting of hydrogenated styrenic block copolymers (SEBS), thermoplastic polyurethane (TPU) or thermoplastic vulcanizates (TPV), and the tensile stress of the band has a value of 3.02 to 4.08 MPa, and the band has a Shore Hardness A of 23.8 to 32.2, the elastic core has a circumferential length of 8-18 cm in its first default configuration, whereby due to a combination of dimensional configuration, physical configuration and material characteristics of the band, the fastener is adapted to assume a first, default, configuration in which an opening defined and surrounded by the loop has a first area and a second, fully expanded, configuration in which the opening defined and surrounded by the loop has a second area, and the band is elongateable up to 8.5 to 10 times of its original length thus enabling the first area of the loop to expand to the second area by a factor 72.3 to 100, and the outer fabric is sufficiently loose to provide room for maximum expansion of the band, and the outer fabric is loosely fitted around the inner core and is made of a loose cloth material but not knitted around the inner core and provided with room between the outer fabric and the inner core for expansion of the inner core within the room, the outer fabric is inelastic and arranged to prevent any direct surface attachment between the inner elastic core and the outer fabric during elongation, thereby maintaining a freely sliding relationship between the inner elastic core and the outer fabric throughout expansion and contraction.

2. A hair fastener as claimed in claim 1, wherein the tensile modulus of the band has a value of 0.37 to 0.49 Mpa.

3. A hair fastener as claimed in claim 1, wherein the maximum pull strength of the band is 57.31N.

4. A hair fastener as claimed in claim 3, wherein the specific gravity of the band has a value of 0.9.

5. A hair fastener as claimed in claim 1, wherein the elastic core is made of hydrogenated styrenic block copolymers (SEBS) and/or thermoplastic vulcanizates (TPV).

6. A method of manufacture of a hair fastener as claimed in claim 1, comprising a step of forming the elastic core by the thermoplastic elastomer by way of injection molding using a melt flow rate of 7.57 to 10.23 to form a continuous closed loop band.

* * * * *